UNITED STATES PATENT OFFICE.

KARL KLIC, OF VIENNA, AUSTRIA-HUNGARY, AND OSCAR POPPE, OF RIXDORF, NEAR BERLIN, GERMANY.

MANUFACTURE OF INLAID LINOLEUM.

SPECIFICATION forming part of Letters Patent No. 692,677, dated February 4, 1902.

Application filed November 27, 1900. Serial No. 37,900. (No specimens.)

*To all whom it may concern:*

Be it known that we, KARL KLIC, a subject of the Emperor of Austria-Hungary, residing at XIII Anhofstrasse 18, in the city of Vienna, Austria-Hungary, and OSCAR POPPE, a subject of the German Emperor, residing at Rixdorf, near Berlin, Germany, have invented new and useful Improvements in the Manufacture of Inlaid Linoleum, of which the following is a specification.

In the known methods of manufacture of inlaid linoleum by joining together variously-colored strips, plates, or the like with the view of forming a pattern either no cementing medium is used, heat and pressure only being depended upon to insure cohesion between the parts thus joined, or a cement is used which is foreign to the linoleum material, such as, for instance, glue. The drawback attending inlaid linoleum made according to the first method is that it is liable to break along the junction-lines where the component parts meet whenever the linoleum is bent, a drawback that cannot be avoided when after having been rolled up for the purpose of storage or transport it is laid out on the floor. The whole structure of such a product is neither so strong nor durable as is that of plain or granite or marbled pattern linoleum, which considerably lessens the otherwise higher value of inlaid linoleum as compared with plain linoleum. Such linoleum in which a cementing medium is used which is foreign to the linoleum material has hardly as yet passed beyond the experimental stage, owing to the many drawbacks characterizing such linoleum. All such drawbacks, however, are met most effectively by using as a cementing medium the linoleum cement itself—*i. e.*, the material used for cementing or binding together the various cork and color particles constituting the strips, plates, or the like intended to form the parts of the pattern. Linoleum-cement is a mixture of oil and resin oxidized to such an extent that a rubber-like consistency is obtained, thus forming an elastic and resistant material insoluble in any solvent. In this manner a perfectly-homogeneous linoleum is obtained free from any substance foreign to its nature. The linoleum-cement, however, being a solid body, it is necessary for the practical purpose in view to reduce it to a liquid or at least a pasty state, and since it neither melts, being decomposed at a high temperature, nor fully dissolves in any known solvent it will serve the purpose of the present invention to swell and gelatinize the cement first in a volatile solvent—such as alcohol, turpentine, benzol, petroleum, bisulfid of carbon, or the like or in a suitable mixture of such solvents and to reduce by mechanical means the gelatinous substance thus obtained until it forms an emulsion. This cement material is then applied to the linoleum parts, which are pressed against each other, as in the case of ordinary gluing, the volatile ingredients then being allowed to evaporate. The inlaid linoleum thus prepared can be handled at once in this condition for the purpose of further treatment. The fixing of the cementing material is, however, not complete until the perfect oxidation of the linseed-oil contained in the cement has taken place. The adhesion is so strong that the linoleum will not break on the lines where the inlaid parts meet, but in some other portion.

The advantages of this process (besides avoiding the drawbacks attending all other processes) are the possibility of a greater variation as regards the composition of the pattern, since the fear of weakening the material and spoiling its adaptability and handiness in consequence of an increase in the number of lines or joints where the parts meet is avoided, owing to the greater resistance of the joints as compared with the main mass and the possibility of applying to linoleum the processes used in the production of marquetry-work in which other material is used.

Having now particularly pointed out our method for manufacturing inlaid linoleum and the manner in which it is performed, we declare that what we claim is—

1. In combination with various pieces of material for forming inlaid linoleum, a linoleum-cement for joining the pieces together, the said cement being gelatinized and triturated so as to form a fluid emulsion.

2. In combination with various pieces of material for forming an inlaid linoleum, a linoleum-cement for joining the pieces together made up of oil and resin mixed and oxidized to a rubber-like consistency after which it is gelatinized by a volatile solvent and then reduced by mechanical means to an emulsion, substantially as described.

3. A cement for making inlaid linoleum containing oil and resin oxidized to such an extent that a rubber-like consistency is obtained, the said mixture being gelatinized by a volatile solvent and then reduced or triturated by mechanical means to form an emulsion, substantially as described.

In testimony whereof we have signed our names to this specification in the presence of the subscribing witnesses.

KARL KLIC.
OSCAR POPPE.

Witnesses as to signature of Karl Klic:
C. B. HURST,
ALVESTO S. HOGUE.

Witnesses as to signature of Oscar Poppe:
WOLDEMAR HAUPT,
HENRY HASPER.